US009868597B2

(12) United States Patent
Henry et al.

(10) Patent No.: US 9,868,597 B2
(45) Date of Patent: *Jan. 16, 2018

(54) SYSTEM AND METHOD FOR AN AIR CART AND ROTARY AIR LOCK

(71) Applicant: CNH Industrial Canada, Ltd., Saskatoon (CA)

(72) Inventors: Jim Henry, Saskatoon (CA); Mark Wileniec, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 131 days.

This patent is subject to a terminal disclaimer.

(21) Appl. No.: 14/558,033

(22) Filed: Dec. 2, 2014

(65) Prior Publication Data

US 2016/0150721 A1  Jun. 2, 2016

(51) Int. Cl.
| | | |
|---|---|---|
| *A01C 7/08* | (2006.01) |
| *A01C 7/10* | (2006.01) |
| *B65G 53/46* | (2006.01) |
| *B65G 67/22* | (2006.01) |
| *A01C 15/00* | (2006.01) |
| *A01B 69/04* | (2006.01) |

(52) U.S. Cl.
CPC .............. *B65G 67/22* (2013.01); *A01C 7/081* (2013.01); *A01C 7/102* (2013.01); *A01C 15/003* (2013.01); *A01C 15/006* (2013.01); *B65G 53/4633* (2013.01); *A01B 69/008* (2013.01)

(58) Field of Classification Search
USPC ...... 414/217; 406/62–68; 222/410, 414, 367
See application file for complete search history.

(56) References Cited

U.S. PATENT DOCUMENTS

| | | | | |
|---|---|---|---|---|
| 2,643,159 A | * | 6/1953 | Brackett | B65G 53/00 406/105 |
| 2,848,281 A | | 8/1958 | Avard | |
| 4,231,495 A | * | 11/1980 | Lund | B65G 53/4633 222/345 |
| 4,268,205 A | * | 5/1981 | Vacca | B65G 53/4633 222/368 |
| 4,575,284 A | * | 3/1986 | Kelm | A01C 7/082 111/34 |
| 5,160,222 A | | 11/1992 | Noland | |

(Continued)

FOREIGN PATENT DOCUMENTS

| | | |
|---|---|---|
| CN | 102160486 | 8/2011 |
| DE | 10319047 | 11/2004 |

*Primary Examiner* — Alicia Torres
(74) *Attorney, Agent, or Firm* — Rebecca L. Henkel; Rickard K. DeMille

(57) ABSTRACT

A system is provide for filling a pressurized tank of an air cart or other storage element while operating to deliver product to a ground engaging tool, such as for seeding or fertilizer placement. A rotary air lock coupled between a feeder and a storage tank includes a plurality of vanes providing pockets in between for holding particulate materials, The rotary air lock rotates the pockets from the feeder to a sealed area and from the sealed area to the storage tank, As such, the rotary air lock transfers the particulate materials to the storage tank while substantially maintaining a pressure in the storage tank. The system may be filled during, field operations, and a filling or conveyor system may be controlled via a vehicle to vehicle (V2V) operation.

17 Claims, 4 Drawing Sheets

(56) References Cited

U.S. PATENT DOCUMENTS

| | | | |
|---|---|---|---|
| 5,324,143 A * | 6/1994 | Sanders | B65G 53/4633 |
| | | | 406/67 |
| 5,567,457 A * | 10/1996 | Martinek | A23L 1/1648 |
| | | | 34/92 |
| 5,725,160 A | 3/1998 | Harper et al. | |
| 6,092,747 A | 7/2000 | Gerber et al. | |
| 7,906,695 B2 | 3/2011 | Giercke | |
| 2005/0235890 A1* | 10/2005 | Mariman | A01C 7/081 |
| | | | 111/174 |
| 2008/0295751 A1 | 12/2008 | Shoup et al. | |
| 2010/0017073 A1* | 1/2010 | Landphair | A01C 7/081 |
| | | | 701/50 |
| 2013/0022433 A1* | 1/2013 | Anderson | A01D 90/02 |
| | | | 414/467 |
| 2013/0061790 A1* | 3/2013 | Binsirawanich | A01C 7/081 |
| | | | 111/174 |
| 2013/0143972 A1 | 6/2013 | Townsend et al. | |

\* cited by examiner

SYSTEM AND METHOD FOR AN AIR CART AND ROTARY AIR LOCK

FIELD OF THE INVENTION

The invention relates generally to apiculture, and in particular, to systems and methods for loading agricultural products.

BACKGROUND OF THE INVENTION

Efficiently delivering agricultural products, such as seeds and fertilizer, to the ground in large areas typically requires a variety of machinery. A tractor may be used to push or pull a ground engaging tool, such as seeder or other planting device, for evenly distributing the agricultural products using a pressurized seed or fertilizer delivery system. The ground engaging tool may, in turn, receive a steady supply of the agricultural products from a pressurized air cart or other storage element that is also typically being pushed or pulled by the tractor.

In agricultural operations, it is desirable to minimize the amount of downtime as much as possible. For delivering agricultural products, this often means using an air cart or other storage element with ever increasing volumes for holding the agricultural products. For example, modern air carts may have a capacity over 500 bushels, thereby allowing even longer operating times.

However, towing an air cart that is too large throughout a field requires significant horsepower which results in inefficiency. On the other hand, having an air cart that is not large enough can save horsepower, but require more costly downtime. For example, it could require at least 30 minutes for filling exceptionally large tanks. In addition, filling typically requires stopping the air cart, bringing a supply vehicle nearby, moving a loading auger into position, starting hydraulics to drive the auger to fill the air cart, verifying correct loading amounts, and re-securing the system to resume field operations at the point they were stopped. This is lost time that could be used for greater productivity in the field.

What is needed is a mechanism to facilitate keeping an air cart full and in operation for as long as possible while minimizing the amount of downtime.

SUMMARY OF THE INVENTION

The present invention provides a system for tilling a storage tank while maintaining a pressure in the storage tank suitable for conducting field continuous operations. Accordingly, an air cart or other storage element may continue to operate to deliver an agricultural product to ground engaging tools, such as for seeding or fertilizer placement, instead of stopping for filling operations.

In embodiments, a rotary air lock may be coupled between a feeder and a storage tank. The rotary air lock may include a plurality of vanes (or outwardly extending slats for physical separation) providing pockets in between for holding particulate materials such as the agricultural product. The rotary air lock rotates the pockets from the feeder to a sealed area and from the sealed area to the storage tank. As such, the rotary air lock transfers the particulate materials to the storage tank while substantially maintaining a pressure in the storage tank. The pressure maintained in the storage tank may be greater than an atmospheric pressure, and typically is a pressure suitable for dispersing agriculture products during field operations.

The system may be filled/re-filled continuously during field operations (while delivering product to the ground), and a filling or conveyor system may he controlled to provide on-the-go filling via vehicle to vehicle (V2V) operation. There are many possible variations for such on-the-go filling within the spirit of the present invention, including as described in a co-pending U.S. patent application (Attorney Docket No. 50284/1016.377), assigned to the common assignee of the instant application, which document is incorporated herein by reference.

U.S. Pat. No. 8,606,454, titled "System and method for synchronized control of a harvester and transport vehicle," assigned to the present assignee and incorporated herein by reference in its entirety, discloses a control system and method for synchronized control of a harvester and transport vehicle during unload on the go operation. The control system can maintain a desired lateral distance between the harvester and transport vehicle using swath information that is used to steer the harvester. In addition, the control system can also bring a transport vehicle into appropriate alignment with the harvester using the same swath information.

The present inventors have recognized that a control system and method may be similarly provided for synchronized control of an agricultural product delivery system and supply vehicle for a load on the go operation. Accordingly, a control system can maintain a desired lateral distance between an air cart, or other storage element, and supply vehicle using swath information that is used to steer the supply vehicle. In addition, the control system can also bring the supply vehicle into appropriate alignment with the an cart or storage element using the same swath information.

As a result, increased productivity in field operations is provided. Also, the need to pull large tanks in the field is reduced, thereby reducing the required horsepower and fuel consumption of tractors. Also, pressurization of tanks may be substantially maintained to facilitate keeping an air cart or other storage element full and in operation.

According to one aspect of the invention, an agricultural product delivery system may comprise: a feeder for receiving particulate materials; a pressurized storage tank for holding particulate materials; and a rotary air lock coupled between the feeder and the storage tank. The rotary air lock may include a plurality of vanes providing pockets in between for holding particulate materials. The rotary air lock may rotate the pockets from the feeder to a sealed area, and from the sealed area to the storage tank. The rotary air lock may be operable to transfer particulate materials from the feeder to the storage tank while substantially maintaining a pressure in the storage tank.

Another aspect may provide a method for filling an agricultural product delivery system. The method may comprise: (a) receiving particulate materials at a feeder; (b) pressurizing a storage tank for holding the particulate materials; (c) using a rotary air lock to transfer the particulate materials from the feeder to the storage tank while substantially maintaining a pressure in the storage tank, wherein the rotary air lock comprises a plurality of vanes providing pockets in between for holding the particulate materials, and wherein the rotary air lock rotates the pockets from the feeder to a sealed area and from the sealed area to the storage tank; and (d) delivering the particulate materials from the storage tank to a ground engaging tool.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
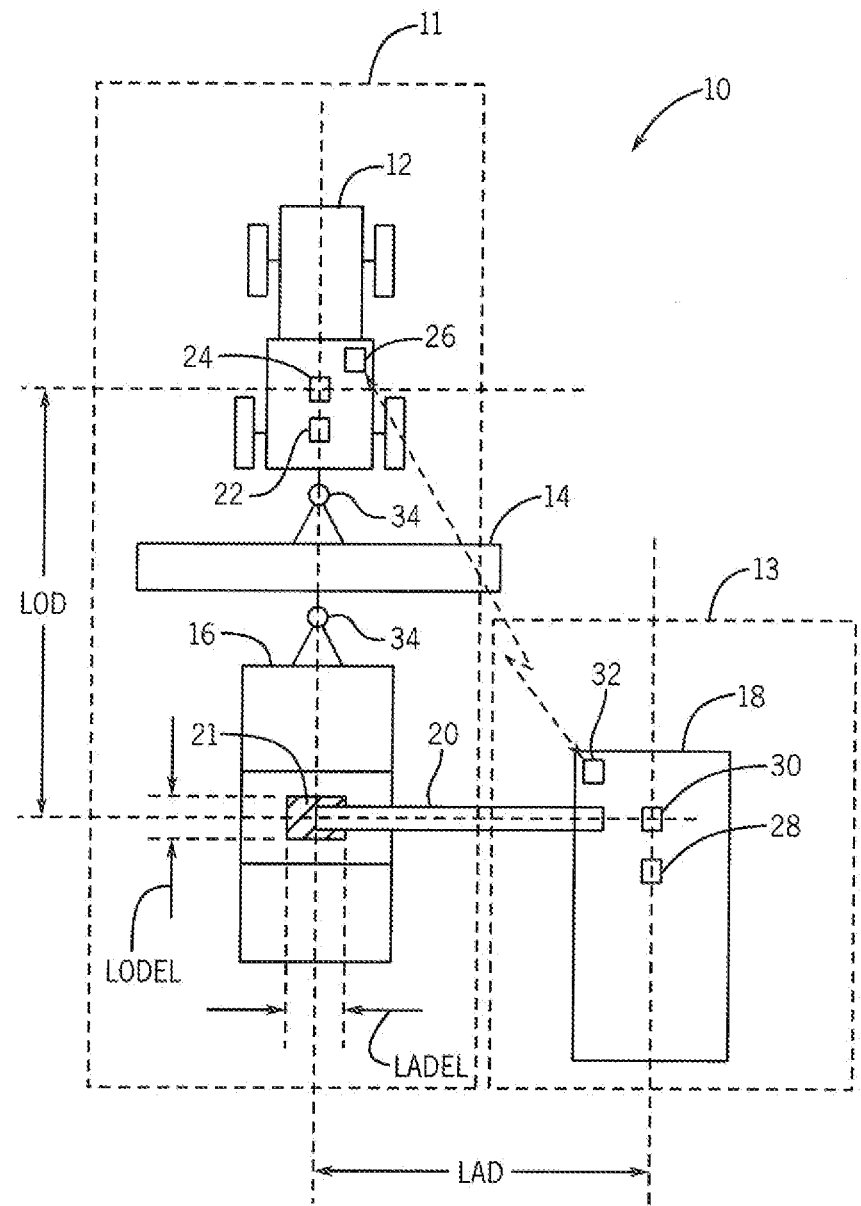
FIG. 1 is a diagram of an exemplar agricultural system in accordance with an embodiment of the present invention.

Referring now to the drawings and specifically to FIG. 1, aspects of the present invention will now be described by way of an exemplar agricultural system 10 in accordance with an embodiment of the present invention. The agricultural system 10 may include an agricultural product delivery system 11, which could include one or more of a tractor, truck or other self-propelled vehicle 12, pulling a ground engaging tool 14, which could be a seeder or other planting device, and pulling an air cart or other storage element 16. It will be appreciated that one or more elements of the agricultural product delivery system 11 could be integrated while keeping within the spirit of the present invention. For example, the ground engaging tool 14 and the air cart 16 could be integrated together, and/or the air cart 16 could be self-propelled. Also, the tractor 12 could alternatively be pushing the ground engaging tool 14 and/or the air cart 16.

The agricultural system 10 also includes a separately operated conveyor or filling system 13 for providing an agricultural product in the form of particulate materials, such as seed or fertilizer, to the agricultural product delivery system. The filling system 13 could include one or more of a supply vehicle 18 and an auger conveyor or other conveyor 20. The supply vehicle 18, which could be a truck, may drive alongside the air cart 16 to unload the particulate materials to the air cart 16, which holds particulate materials, via the auger conveyor 20. The auger conveyor 20 may be a screw-type conveyor for lifting the particulate materials from the supply vehicle 18 to the air cart 16, though other conveyor systems known in the art could be used. The agricultural product delivery system 11 and the filling system 13 are configured for vehicle to vehicle (V2V) operation substantially as described in U.S. Pat. No. 8,606,454 incorporated herein by reference in its entirety.

In an exemplary embodiment, the tractor 12 and the supply vehicle 18 can be controlled by a global positioning system (GPS) based auto-guidance control system(s) in order to maintain a desired lateral distance (LAD) and a desired longitudinal distance (LOD) between the supply vehicle 18 and the air cart 16 (towed by the tractor 12). One exemplary embodiment of the reference points used for measuring the desired lateral distance and desired longitudinal distance is shown in FIG. 1. However, any suitable reference points for measuring lateral distance and longitudinal distance can be used. The desired lateral distance and desired longitudinal distance can both be a preselected distances plus or minus a predetermined offset that ensures that the particulate materials provided by the supply vehicle 18 are received and stored by the air cart 16. As shown in FIG. 1, the lateral distance error limits (LADEL) define the maximum and minimum lateral distances that can be used for load on the go operation. Similarly, the longitudinal distance error limits (LODEL) define the maximum and minimum longitudinal distances that can be used for load on the go operation. The preselected lateral and longitudinal distances and the corresponding predetermined offsets can be related to the particular air carts and filling systems being used, specifically the size of a feeder 21 area for the air cart 16 and an estimate of the shoot-out distance or pattern of the particulate materials from the auger conveyor 20 to the air cart 16. Accordingly, alignment between the filling system, such as the auger conveyor 20, and the feeder 21 may be substantially maintained while the agricultural product delivery system 11 is in motion.

The tractor 12 can have: a controller 22 that includes a display unit or user interface and a navigation controller; a GPS device 24 that includes an antenna and receiver; and a wireless communication unit or device (WCU) 26 that can include a power control switch. Similarly, the supply vehicle 18 can have a controller 28 that can include a display unit or user interface, a navigation controller and tractor vehicle to vehicle control unit (TV2V); a GPS device 30 that can include an antenna and receiver; and a wireless communication unit or device (WCU) 32 that can include a power control switch. The controllers can be used to control operation and/or steering of the supply vehicle 18 and/or air cart 16 (via the tractor 12), regardless of the machine in which the controller may be installed. The GPS device can be used to determine the position of the supply vehicle 18 or air cart 16 and the wireless communication device can be used to send and receive information, data and control signals between the supply vehicle 18 and the air cart 16. Also, hitch angle sensors 34 could be used to determine the relative angles or hitch angles between the tractor 12, the ground engaging tool 14 and the air cart 16.

Figure 2:
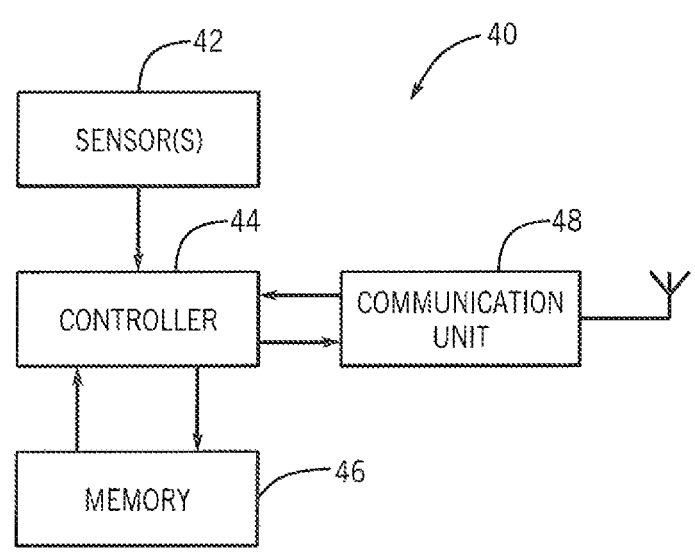
FIG. 2 is a block diagram illustrating a control system for use with an agricultural system in accordance with an embodiment of the present invention.

Referring now to FIG. 2, a block diagram illustrating a control system 40 for use with the agricultural system 10 is provided in accordance with an embodiment of the present invention. In an embodiment, the control system 40 may be implemented in the agricultural product delivery system, such as in the tractor 12 (towing the air cart 16), or in the air cart 16, for substantially maintaining an alignment between the filling system, such as the supply vehicle 18 and/or the auger conveyor 20, and the feeder 21. Alternatively, the control system 40 could be implemented in the filling system 13 for substantially maintaining such alignment.

The control system 40 includes one or more sensors 42 communicating sensed data to a controller 44. The sensors 42 may include one or more of GPS sensors, hitch sensors, gyroscopes, accelerometers, and so forth. The controller 44 may be a microcontroller, microprocessor or other processing logic capable of executing a program stored in a non-transient computer readable medium. The controller 44 may be in communication with a memory 46, which may be a non-volatile reprogrammable memory, such as Flash memory. The memory 46 may store the program executed by the controller 44, and/or more store other parameters related to the determinations of LAD, LOD, LADEL as discussed above. The controller 44 is also in communication with a wireless communication unit 48 for communicating with the other system in the agricultural system 10.

By way of example, in operation with the control system 40 implemented in the agricultural product delivery system, such as the tractor 12, the control system 40 may operate to control the filling system, such as the auger conveyor 20, to substantially maintain an alignment between the feeder 21 of the air cart 16 and the auger conveyor 20 of the supply vehicle 18. The controller 44 may sense a GPS location of the tractor 12 and hitch angle sensors of the ground engaging tool 14 and the air cart 16 in tow, and determine a position of the feeder 21 using distance/dimension parameters held in the memory 46. The controller 44 may also receive a GPS location of the supply vehicle 18 and/or the auger conveyor 20 via the wireless communication unit 48. Accordingly, the controller 44 may execute to determine a position and speed for the supply vehicle 18 that is sufficient to substantially maintain an alignment between the feeder 21 and the auger conveyor 20. The controller 44 may then wirelessly communicate such information to the supply vehicle 18, and, upon confirmation that each system is ready for loading, the controller 44 may signal or otherwise allow the particulate materials to be loaded to the air cart 16 from the supply vehicle 18. Other data exchanges between the agricultural product delivery system 11 and the filling system 13 can also be provided.

Conversely, the control system 40 could similarly be implemented in the supply vehicle 18. For example, in this case, the controller 44 would sense a GPS location of the supply Vehicle 18 and/or the auger conveyor 20, and receive a GPS location of the tractor 12 and hitch angle sensors of the ground engaging tool 14 and the air cart 16 in tow via the wireless communication unit 48. Accordingly, the controller 44 would execute to determine a position and speed for the tractor 12 that is sufficient to substantially maintain an alignment between the auger conveyor 20 and the feeder 21. The controller 44 may then wirelessly communicate such information to the tractor 12, and, upon confirmation that each system is ready for loading, the controller 44 may signal or otherwise allow the particulate, materials to be loaded to the air cart 16 from the supply vehicle 18.

Accordingly, a method is provided for loading an agricultural product, such as seed, fertilizer or other particulate materials, to the agricultural product delivery system 11 during field operations. The feeder 21, such as on the an cart 16, receives the particulate materials from the filling system 13 while in motion. Using an air lock, the particulate materials are transferred from the feeder 21 to a storage tank of the air cart 16 for holding the particulate materials. The air lock transfers the particulate materials while substantially maintaining a pressure in the storage tank to permit ongoing field operations. In addition, the an lock may be used to measure the volume of particulate materials (or product) going to the storage tank of the air cart 16. For example, a number of revolutions or other actuations of the air lock may be counted, such as by a Hall effect sensor and/or similar sensing hardware, and calculated by the controller 44 to determine a corresponding amount of product transferred. Also, a V2V system permits electronic sensing and control to substantially maintain an alignment between the filling system 13 and the feeder 21 while the agricultural product delivery system 11 is in motion.

Figure 3:
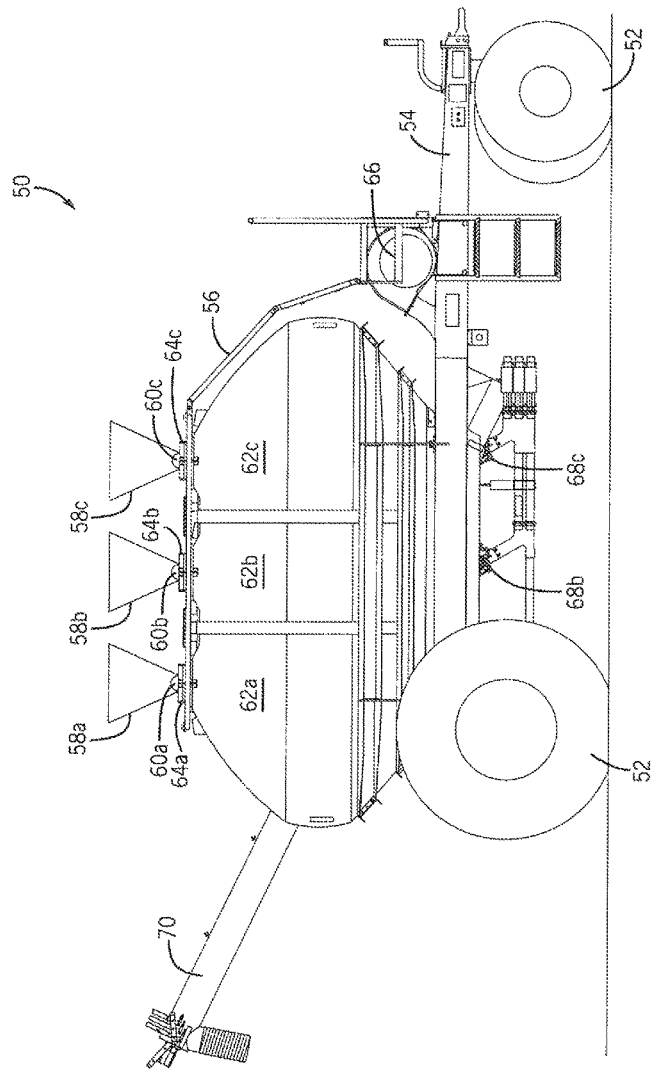
FIG. 3 is a side view of an air cart which may be part of an agricultural product delivery system in accordance with an embodiment of the present invention.

Referring now to FIG. 3, a side view of an air cart 50, which may be part of an agricultural product delivery system, is provided in accordance with an embodiment of the present invention. The air cart 50 may include wheels 52 supporting a chassis 54 and a body 56 for towing behind a tractor, a seeder or other implement. Alternatively, the air cart 50 could be configured to be pushed or self-propelled.

One or more feeders 58 are disposed over the body. The feeders are configured to receive particulate materials, and could be, for example, hoppers having a wider area opening above for catching the particulate materials, and a narrowing opening below for funneling the particulate materials. Below each feeder 58 is an air lock 60. The air lock 60 is operable to transfer the particulate materials from the feeder 58 to a storage tank 62, disposed below the air lock 60, while substantially maintaining a pressure in the storage tank 62. The air lock 60 may also include sensing hardware, such as a Hall effect sensor, to measure the volume of particulate materials (or product) going to the storage tank 62. The storage tank 62 may be a single storage tank, which may have capacity over 500 bushels; or the storage tank 62 may include a plurality of separate storage tanks 62a, 62b and 62c. The storage tank 62 may have a capacity over 500 bushels. The air lock 60, and/or the feeder 58, may be integrated with a lid 64 for manually accessing the storage tank 62. The lid 64 may be opened to provide visual inspection of the storage tank 62 and retain the possibility of filling the storage tank 62 manually/conventionally. The feeder 58 and/or the air lock 60 may also be manufactured from plastic to reduce weight.

During operation, an air system 66 drives air into the storage tanks 62 to produce a pressure sufficient for field operations. Accordingly, the pressure in the storage tank 62 permits one or more metering boxes 68 to transfer the particulate materials from respective the storage tanks 62 to the ground engaging tool for application at a general transfer rate, such as 2 to 3 particulate materials per second.

In addition, the air cart 50 may include a filling system 70, such as an auger conveyor. Accordingly, the filling system 70 may be deployed to swing into position with a supply vehicle.

In a preferred embodiment, multiple individual storages tanks 62a, 62b and 62c are provided for storing one or more types of particulate materials. Each of the storages tanks 62a, 62b and 62c couple to a respective air lock 60a, 60b and 60c. In turn, each of the air locks 60a, 60b and 60c couple to a respective feeder 58a, 58b and 58c. Accordingly, different types of particulate materials may be deposited into the different storages tanks 62a, 62b and 62c at the same time or at different times. The air system 66 may drive air into the storage tanks 62a, 62b and 62c to produce a pressure sufficient for field operations. Accordingly, the pressure in the tanks 62a, 62b and 62c permits respective metering boxes 68a, 68b and 68c to transfer the particulate materials from respective the storage tanks 62a, 62b and 62c to the ground engaging tool at various times for application.

Figure 4:
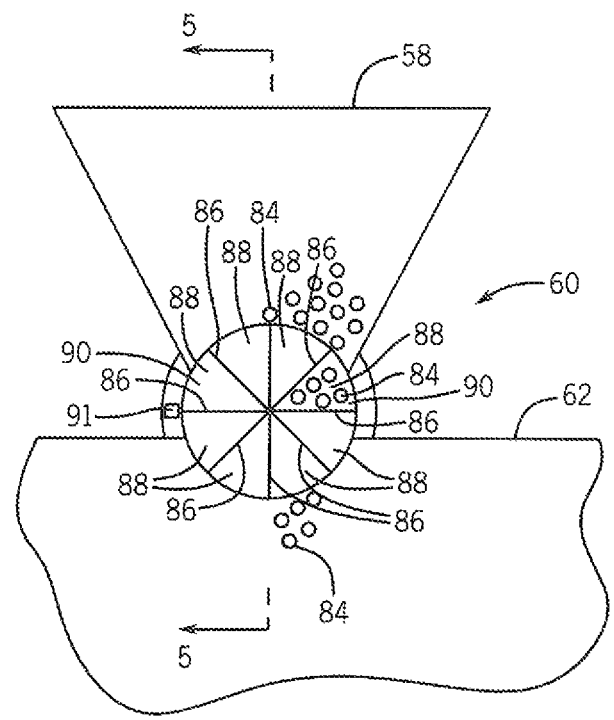
FIG. 4 is a side view of a feeder and a rotary air lock in accordance with an embodiment of the present invention.

Referring now to FIG. 4, a side view of the feeder 58, which is in this example a hopper, and the air lock 60 which is in this example is a rotary air lock, are provided in accordance with an embodiment of the present invention. The feeder 58 has a wider area opening above for catching particulate materials 84 from a filling system. In turn, the particulate materials 84 fall toward the bottom of the feeder 58, and funnel into the rotary an lock 60 positioned below the feeder 58.

Figure 5:
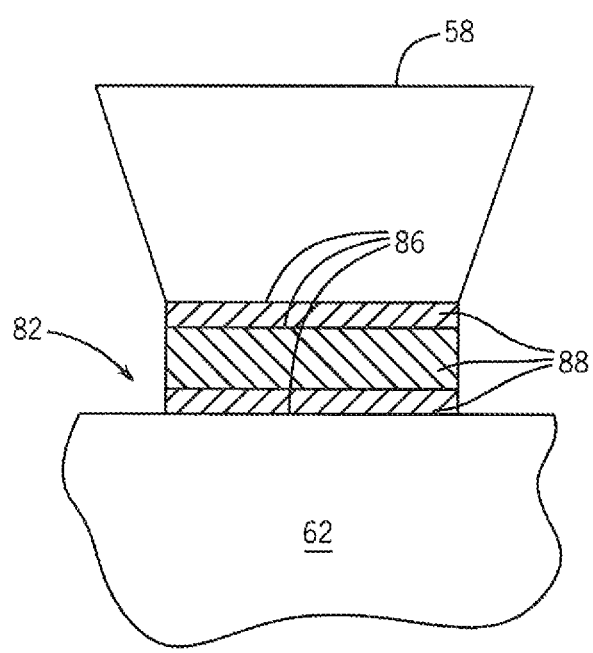
FIG. 5 is a sectional view of the rotary air lock of FIG. 4 taken along the line 5-5.

The rotary air lock 60 includes a plurality of vanes 86 providing pockets 88 in between the vanes 86 for holding the particulate materials 84. FIG. 5 illustrates a sectional view of the feeder 58 and the rotary air lock 60 of FIG. 4 taken along the line 5-5. In operation, as a pocket 88 facing the feeder 58 fills with the particulate materials 84, the rotary air lock 60 rotates the pocket 88, clockwise or counterclockwise, to a substantially sealed area 90. Then, the rotary air lock 60 rotates the pocket 88 again, such that the pocket 88 then faces a storage tank 62 for transferring the particulate materials 84 into the storage tank 62. The sealed area 90, between the feeder 58 and the storage tank 62, may use an airtight seal or gasket 94, and may include sensing hardware 91, such as a Hall effect sensor, for counting the number of revolutions of the rotary air lock 60 to measure the volume of particulate materials (or product) going to the storage tank 62. As a result, by rotating the pockets 88 to the sealed area 90 first, then to the storage tank 62, a pressure suitable for active field operations can be substantially maintained in the storage tank 62. In addition, the amount of particulate materials (or product) going to the storage tank 62 may be approximately determined.

Certain terminology is used herein for purposes of reference only, and thus is not intended to be limiting. For example, terms such as "upper," "lower," "above," and "below" refer to directions in the drawings to which reference is made. Terms such as "front," "back," "rear" "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Many changes and modifications could be made to the invention without departing from the spirit thereof. The scope of these changes will become apparent from the appended claims.

We claim:

1. An agricultural product delivery system comprising:
   a feeder for receiving particulate materials;
   a pressurized storage tank for holding particulate materials;
   a rotary air lock coupled between the feeder and the storage tank, the rotary air lock comprising first and second vanes providing a pocket in between for holding particulate materials, wherein the rotary air lock rotates the pocket from the feeder to a sealed area and from the sealed area to the storage tank;
   a metering box operatively connected to the storage tank and configured to transfer the particulate materials from the storage tank to a ground engaging tool;
   sensing hardware in communication with the sealed area, the sensing hardware being configured to measure a volume of particulate material transferred from the feeder to the storage tank by the rotary air lock; and,
   wherein:
   with the pocket in communication with the storage tank, the particulate materials exit the pockets and fall into the storage tank; and
   the rotary air lock is operable to transfer particulate materials from the feeder to the storage tank while substantially maintaining a pressure in the storage tank.

2. The delivery system of claim 1, wherein the storage tank is operable to transfer particulate materials under pressure to a ground engaging tool.

3. The delivery system of claim 1, further comprising a tank lid for manually accessing the storage tank.

4. The delivery system of claim 3, wherein the air lock and the feeder are part of the tank lid.

5. The delivery system of claim 4, wherein at least one of the air lock and the feeder is manufactured from plastic.

6. The delivery system of claim 2, wherein the feeder is a hopper.

7. The delivery system of claim 1, wherein the delivery system is an air cart and the storage tank has a capacity over 500 bushels.

8. The delivery system of claim 1, further comprising a control system for controlling a filling system providing particulate materials to the feeder, wherein the control system is configured to communicate with the filling system to substantially maintain an alignment between the filling system and the feeder.

9. The delivery system of claim 1, further comprising a plurality of feeders, a plurality of storage tanks, and air locks coupled between each feeder and storage tank to transfer the particulate materials from the feeders to the storage tanks while substantially maintaining pressures in the storage tanks.

10. The delivery system of claim 1, wherein the rotary air lock is further operable to measure the particulate materials transferred from the feeder to the storage tank.

11. A method for filling an agricultural product delivery system comprising:
    (a) receiving particulate materials at a feeder;
    (b) pressurizing a storage tank for holding the particulate materials;
    (c) using a rotary air lock to transfer the particulate materials from the feeder to the storage tank while substantially maintaining a pressure in the storage tank, wherein the rotary air lock comprises a plurality of vanes providing pockets in between for holding the particulate materials, and wherein the rotary air lock rotates the pockets from the feeder to a sealed area and from the sealed area to the storage tank such that the particulate materials exit the pockets and fall into the storage tank;
    (d) transferring the particulate materials from the storage tank to a ground engaging tool with a metering box operatively connected to the storage tank; and
    (e) using a sensing hardware, sensing a volume; of particulate material passing through the sealed area from the feeder to the storage tank.

12. The method of claim 11, further comprising using a metering box to control a general transfer rate of the particulate materials to the ground engaging tool.

13. The method of claim 11, further comprising controlling a filling system providing particulate materials to the feeder to substantially maintain an alignment with the feeder.

14. The method of claim 13, wherein the filling system comprises a supply vehicle and an unloading auger.

15. The method of claim 11, further comprising receiving particulate materials at a plurality of feeders, pressurizing a plurality of storage tanks, and using air locks coupled between the feeders and the storage tanks to transfer the particulate materials to the storage tanks while substantially maintaining pressures in the storage tanks.

16. The method of claim 15, further comprising maintaining a first pressure in a first storage tank different than a second pressure in a second storage tank.

17. An agricultural product delivery system comprising;
a ground engaging tool;
a feeder for receiving particulate materials;
a pressurized storage tank for holding particulate materials;
a rotary air lock coupled between the feeder and the storage tank, the rotary air lock comprising a plurality of vanes providing pockets in between for holding particulate materials, wherein the rotary air lock rotates each pocket from the feeder to a sealed area and from the sealed area to the storage tank;
sensing hardware in communication with the sealed area, the sensing hardware being configured to measure a volume of particulate material transferred from the feeder to the storage tank by the rotary air lock: and
a metering box operatively connected to the storage tank and configured to transfer the particulate materials from the storage tank to the ground engaging tool; wherein:
with the pockets in communication with the storage tank, the particulate materials exit the pockets and fall into the storage tank;
the rotary air lock is operable to transfer particulate materials from the feeder to the storage tank while substantially maintaining a pressure in the storage tank, and
the storage tank is operable to transfer particulate materials under pressure to the ground engaging tool.

* * * * *